W. P. Lyon,
Oyster Opener,

N°54,566. Patented May 8, 1866.

UNITED STATES PATENT OFFICE.

WILLIAM P. LYON, OF PORT CHESTER, NEW YORK.

IMPROVED OYSTER-CRACKER.

Specification forming part of Letters Patent No. 54,566, dated May 8, 1866.

*To all whom it may concern:*

Be it known that I, W. P. LYON, of Port Chester, Westchester county, State of New York, have invented a new and Improved Implement for Cracking Oysters; and I do hereby declare that the following is a full, clear, and exact description thereof, which will enable others skilled in the art to make and use the same, reference being had to the accompanying drawings, forming part of this specification.

The present invention relates to an implement especially intended to be used for the cracking or breaking of oysters and other shell-fish, although it can be applied for the cracking of nuts and many other articles; and it consists in a novel manner of operating the movable jaw, between which and the fixed jaw of the implement the oyster or other article is placed to be cracked, as will be more fully described, reference being had to the accompanying plate of drawings, in which—

Figure 1:
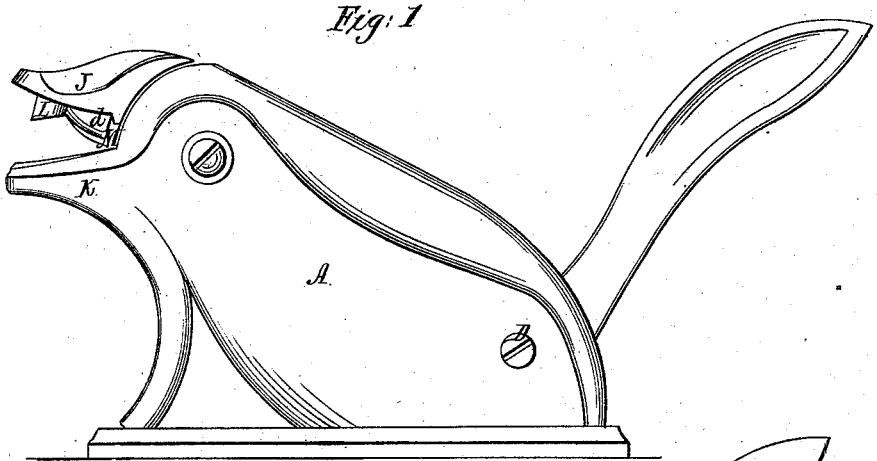
Figure 2:
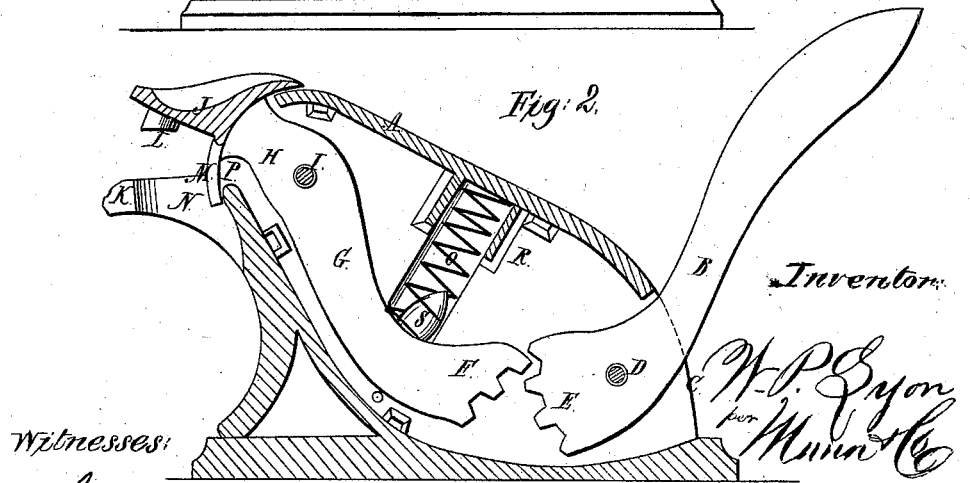

Figure 1 is a side view and elevation of the implement, and Fig. 2 a central section through the same.

Similar letters of reference indicate like parts.

A in the drawings represents the case of the instrument or implement, made in the form of a dog or other animal, or any other suitable form or shape, in and between the sides of which, at the lower end, is hung a lever-arm or handle, B, projecting through a vertical slot, C, at such end and turning upon a fulcrum or center pin, D, of the said casing, with its sector-shaped toothed end E engaged or interlocked with the corresponding sector-shaped toothed end F of a bent arm, G, extending upward through the casing, turning, at or near its upper end, H, upon a fulcrum-pin, I, the upper end of the arm G projecting from the casing and forming the movable jaw J of the implement, below which is the fixed jaw K cut out in its center through its whole thickness. The under side of the movable jaw J is provided with a knob or plug, L, at or near its center, from which to the tongue-piece M, extending through the opening N of the fixed jaw, is a sharp edge or rib, *d*, the tongue-piece M serving as a cover to the opening or slot P of the implement-casing, in which the movable jaw plays or moves.

Q is a spiral spring placed within the socket R of the casing A, and by its other end over the knob S of the arm G, resting upon such arm.

In the use of the implement above described the oyster to be cracked is placed by the proper end in and between the two jaws J and K, when, depressing the handle-arm B with the hand, the plug of the movable jaw J is brought down upon the same, breaking or cracking it, as desired, the loose particles falling through the opening of the fixed jaw, when, removing the hand from the arm B, the movable jaw is immediately raised or lifted from the fixed jaw by the action of the spiral spring Q, arranged within the casing and bearing upon the arm G, as specified.

By means of the sharp edge or rib *d* the cracking of the oyster is facilitated, and all large broken particles broken sufficiently to fall through the opening of the lower jaw; and furthermore, the tongue-piece M prevents any particles of the shell from entering the casing A through the slot in which the arm G plays.

The implement hereinabove described may be used as well for the cracking of nuts as oysters, and therefore I do not intend to limit myself to any particular article to be cracked or broken in it.

I claim as new and desire to secure by Letters Patent—

The combination of the casing A, lever-handle B, arm G, terminating in a jaw, J, and fixed jaw K of casing A, when connected together and arranged as and for the purposes described.

The above specification of my invention signed by me this 15th day of March, 1866.

WILLIAM P. LYON.

Witnesses:
 WM. F. McNAMARA,
 ALBERT W. BROWN.